(12) United States Patent  
Colrain et al.

(10) Patent No.: US 7,058,629 B1  
(45) Date of Patent: Jun. 6, 2006

(54) SYSTEM AND METHOD FOR DETECTING TERMINATION OF AN APPLICATION INSTANCE USING LOCKS

(75) Inventors: Carol L Colrain, Redwood Shores, CA (US); Xing Du, Sammamish, WA (US)

(73) Assignee: Oracle International Corporation, Redwood Shores, CA (US)

( * ) Notice: Subject to any disclaimer, the term of this patent is extended or adjusted under 35 U.S.C. 154(b) by 401 days.

(21) Appl. No.: 10/087,494

(22) Filed: Feb. 28, 2002

Related U.S. Application Data (60) Provisional application No. 60/272,386, filed on Feb. 28, 2001.

(51) Int. Cl.  
*G06F 17/30* (2006.01)

(52) U.S. Cl. .............. 707/8; 707/10; 710/200; 709/224

(58) Field of Classification Search .............. 707/1–10; 709/224; 710/200, 220; 718/104  
See application file for complete search history.

(56) References Cited

U.S. PATENT DOCUMENTS

| | | | |
|---|---|---|---|
| 5,623,666 A * | 4/1997 | Pike et al. ................. 707/200 |
| 5,659,781 A | 8/1997 | Larson | |
| 5,706,516 A | 1/1998 | Chang et al. | |
| 5,727,206 A * | 3/1998 | Fish et al. ................. 707/202 |
| 5,802,523 A | 9/1998 | Jasuja et al. | |
| 5,828,876 A * | 10/1998 | Fish et al. ................. 707/1 |
| 5,872,981 A * | 2/1999 | Waddington et al. ....... 710/200 |
| 5,890,153 A * | 3/1999 | Fukuda et al. ............. 707/8 |
| 6,105,026 A * | 8/2000 | Kruglikov et al. ......... 707/8 |
| 6,108,654 A * | 8/2000 | Chan et al. ............... 707/8 |
| 6,148,299 A * | 11/2000 | Yoshimoto ................ 707/8 |
| 6,314,563 B1 * | 11/2001 | Agesen et al. ............. 717/108 |
| 6,347,374 B1 * | 2/2002 | Drake et al. .............. 726/1 |
| 6,370,529 B1 * | 4/2002 | Kruglikov et al. ......... 707/8 |
| 6,401,120 B1 | 6/2002 | Gamache et al. | |
| 6,418,542 B1 * | 7/2002 | Yeager .................... 714/38 |
| 6,463,457 B1 | 10/2002 | Armentrout et al. | |
| 6,466,574 B1 | 10/2002 | Fujisaki et al. ........... 370/356 |
| 6,549,957 B1 | 4/2003 | Hanson et al. ............ 710/5 |
| 6,625,602 B1 * | 9/2003 | Meredith et al. .......... 707/8 |
| 6,708,195 B1 * | 3/2004 | Borman et al. ............ 718/102 |
| 6,718,486 B1 | 4/2004 | Roselli et al. ............ 714/41 |

(Continued)

OTHER PUBLICATIONS

Gray J et al., "Transaction Processing: Concepts and Techniques," 1993, pp. 128-138, Morgan Kaufman, San Francisco, CA.

(Continued)

*Primary Examiner*—Debbie M. Le  
(74) *Attorney, Agent, or Firm*—Hickman Palermo Truong & Becker LLP (57) ABSTRACT

A system and method for detecting termination of an application, such as a database instance, that uses locks is described. A holding child process is started from a parent process. The holding child process connects to a monitored application instance, acquires an exclusive lock on the monitored application instance and returns a ready signal upon successfully acquiring the exclusive lock. A waiting child process is started from the parent process subsequent to the holding child process. The holding child process connects to the monitored application instance, blocks on the exclusive lock on the monitored application instance and returns a result signal upon at least one of acquiring the exclusive lock and clearing the block on the exclusive lock. The return signal is processed at the parent process. Using locks provides immediate detection that the application has terminated. Methods for blocking against the application are also described.

15 Claims, 8 Drawing Sheets

U.S. PATENT DOCUMENTS

| | | | |
|---|---|---|---|
| 6,772,255 B1 * | 8/2004 | Daynes | 710/200 |
| 6,799,173 B1 | 9/2004 | Czajkowski et al. | |
| 6,804,711 B1 | 10/2004 | Dugan et al. | |
| 6,807,540 B1 * | 10/2004 | Huras et al. | 707/8 |
| 6,892,205 B1 * | 5/2005 | Colrain et al. | 707/100 |
| 2002/0107957 A1 | 8/2002 | Zargham et al. | 709/224 |
| 2004/0205414 A1 | 10/2004 | Roselli et al. | 714/39 |
| 2005/0171945 A1 | 8/2005 | Colrain et al. | |

OTHER PUBLICATIONS

"Sun Cluster 2.2 Software Installation Guide," Sun Microsystems, Part No. 809-5342, Jul. 2000, Revision A.

"Compact ProLiant Clusters HA/F100 and HA/F200 Administrator Guide," Compaq Computer Corporation, Part No. 380362-002, Second Edition (Sep. 1999).

* cited by examiner

SYSTEM AND METHOD FOR DETECTING TERMINATION OF AN APPLICATION INSTANCE USING LOCKS

CROSS-REFERENCE TO RELATED APPLICATION

This patent application claims priority under 35 U.S.C. § 119(e) to provisional patent application Ser. No. 60/272,386, filed Feb. 28, 2001, the disclosure of which is incorporated by reference.

FIELD OF THE INVENTION

The present invention relates in general to systems and methods with high availability operating requirements and, in particular, to a system and method for detecting termination of an application instance using locks.

BACKGROUND OF THE INVENTION

Cluster databases provide location transparency to data by allowing multiple systems to serve the same database. One specific type of cluster database is the Oracle Real Application Clusters product, licensed by Oracle Corporation, Redwood Shores, Calif. Sets of two or more computers are grouped into real application clusters. The clusters harness the processing power of multiple interconnected computers to provide a single robust computing environment. Within each cluster, all nodes concurrently execute transactions against the same database to synergistically extend the processing power beyond the limits of an individual component. Upon the mounting of the shared database, the real application cluster processes a stream of concurrent transactions using multiple processors on different nodes. For scale-up, each processor processes many transactions. For speed up, one transaction can be executed spanning multiple nodes.

Cluster databases provide several advantages over databases that use only single nodes. For example, cluster databases take advantage of information sharing by many nodes to enhance performance and database availability. In addition, applications can be sped up by executing across multiple nodes and can be scaled-up by adding more transactions to additional nodes. Multiple nodes also make cluster databases highly available through a redundancy of nodes executing separate database instances. Thus, if a node or database instance fails, the database instance is automatically recovered by the other instances which combine to serve the cluster database.

Cluster databases can be made more highly available through integration with high availability frameworks for each cluster. The inclusion of these components provides guaranteed service levels and ensures resilient database performance and dependable application recovery. Organizationally, individual database servers are formed into interconnected clusters of independent nodes. Each node communicates with other nodes using the interconnection. Upon an unplanned failure of an active database server node, using clusterware, an application will fail over to another node and resume operations, without transaction loss, within a guaranteed time period. Likewise, upon a planned shutdown, an application will be gracefully switched over to another node in an orderly fashion.

The guarantee of service level thresholds is particularly crucial for commercial transaction-based database applications, such as used in the transportation, finance, and electronic commerce industries. System downtime translates to lost revenue and loss of market share. Any time spent recovering from a system failure is measurable in terms of lost transactions. Consequently, high availability systems budget a set time period to help minimize lost revenue due to unplanned outages. High availability systems also budget for planned service interruptions.

Effective failover detection requires fast notification of unexpected database instance termination. In the prior art, two types of monitors are used to detect database instance termination. A looks-alive monitor is a lightweight process that issues an alert when the database instance terminates. An is-alive monitor is a heavyweight process that issues an alert when the database instance is not functioning or performing properly. The termination notification functions as a signal to the surviving nodes to immediately transfer the application services provided by the failed node to a preselected standby node. Consequently, these monitors must be fast enough to detect the termination of a database instance as soon after a termination event occurs as is possible.

Due to the less expensive mechanisms used, looks-alive monitoring is executed more frequently than is-alive monitoring. Typically, looks-alive monitoring is performed in two ways. First, the process table can be read on every invocation to tally those mandatory processes that pertain to the monitored database instance. Periodically, the process table is scanned to detect any terminations. The approach is inherently late. The cycle for waking up and checking the process table typically occurs every 30 seconds. Thus, notification can also be delayed for up to 30 seconds and can exceed the high availability time budget. Moreover, this approach is poll-based and continuously consumes processing resources. Finally, the scan is subject to hanging, which is most likely to occur when the system failure is in a failure state and when the looks-alive monitor is most needed to initiate a failover.

Second, process identifiers can be monitored instead of the process table. The process identifiers are obtained from the operating system when the database instance starts and only these process identifiers are checked on every invocation of the detection process. Although simpler, this approach is crude and ad hoc. For example, in a UNIX operating system environment, the list of process identifiers is established and a "kill -0" command is periodically executed against each process identifier. In response, an error message is generated by each process. However, since error messages can also be raised in other situations, this approach is only marginally accurate. Moreover, this approach is also poll-based and subject to hanging and therefore suffers similar drawbacks as the process table approach. Similarly, notification can be delayed 30 seconds or longer and can also exceed the high availability time budget.

Therefore, there is a need for an approach to detecting the termination of a database instance within the constraints of a high availability time budget. Such an approach must provide substantially immediate notification without continuously consuming processing resources.

There is a further need for a lightweight process for immediately detecting the termination of a database instance. Such an approach would take advantage of any internal monitors inherent in a parallel clustering framework.

SUMMARY OF THE INVENTION

The present invention provides a lock-based system and method for detecting the termination of a database instance. In the described embodiment, a parent process forks a holding and a waiting routine in serial order. The holding routine obtains an exclusive lock on a pseudo-object in the monitored database instance and sleeps. The waiting routine then attempts to acquire the exclusive lock and blocks pending the release of the exclusive lock. Upon obtaining the exclusive lock, the waiting routine returns an outcome to the parent process, which then validates any termination.

The present invention also provides an event-based system and method for detecting the termination of a database instance. A main routine is executed by a monitoring database instance, which spawns a waiting subroutine that blocks on a named event in a monitored database instance. The waiting subroutine blocks on a semaphore and the main routine processes the outcome from the waiting subroutine upon the unblocking of the named event.

The present invention also provides a registered process-based system and method for detecting the termination of a database instance. Mandatory processes register with a process group managed by a cluster service in a monitored node. When one of the registered processes terminates, the process de-registers from the process group and induces a signal to the cluster service that the application has terminated.

An embodiment of the present invention is a system and method for detecting termination of an application instance using locks. A holding child process is started from a parent process. The holding child process connects to a monitored application instance, acquires an exclusive lock on the monitored application instance and returns a ready signal upon successfully acquiring the exclusive lock. A waiting child process is started from the parent process subsequent to the holding child process. The holding child process connects to the monitored application instance, blocks on the exclusive lock on the monitored application instance and returns a result signal upon at least one of acquiring the exclusive lock and clearing the block on the exclusive lock. The return signal is processed at the parent process.

A further embodiment is a system and method for detecting termination of a database instance using events. A waiting subroutine is started from a main routine. The waiting subroutine connects to a monitored database instance, blocks on a named event in the database instance and returns a result to the main routine upon an occurrence of the named event. The result is processed at the main routine.

Still other embodiments of the present invention will become readily apparent to those skilled in the art from the following detailed description, wherein is described embodiments of the invention by way of illustrating the best mode contemplated for carrying out the invention. As will be realized, the invention is capable of other and different embodiments and its several details are capable of modifications in various obvious respects, all without departing from the spirit and the scope of the present invention. Accordingly, the drawings and detailed description are to be regarded as illustrative in nature and not as restrictive.

DETAILED DESCRIPTION

Figure 1:
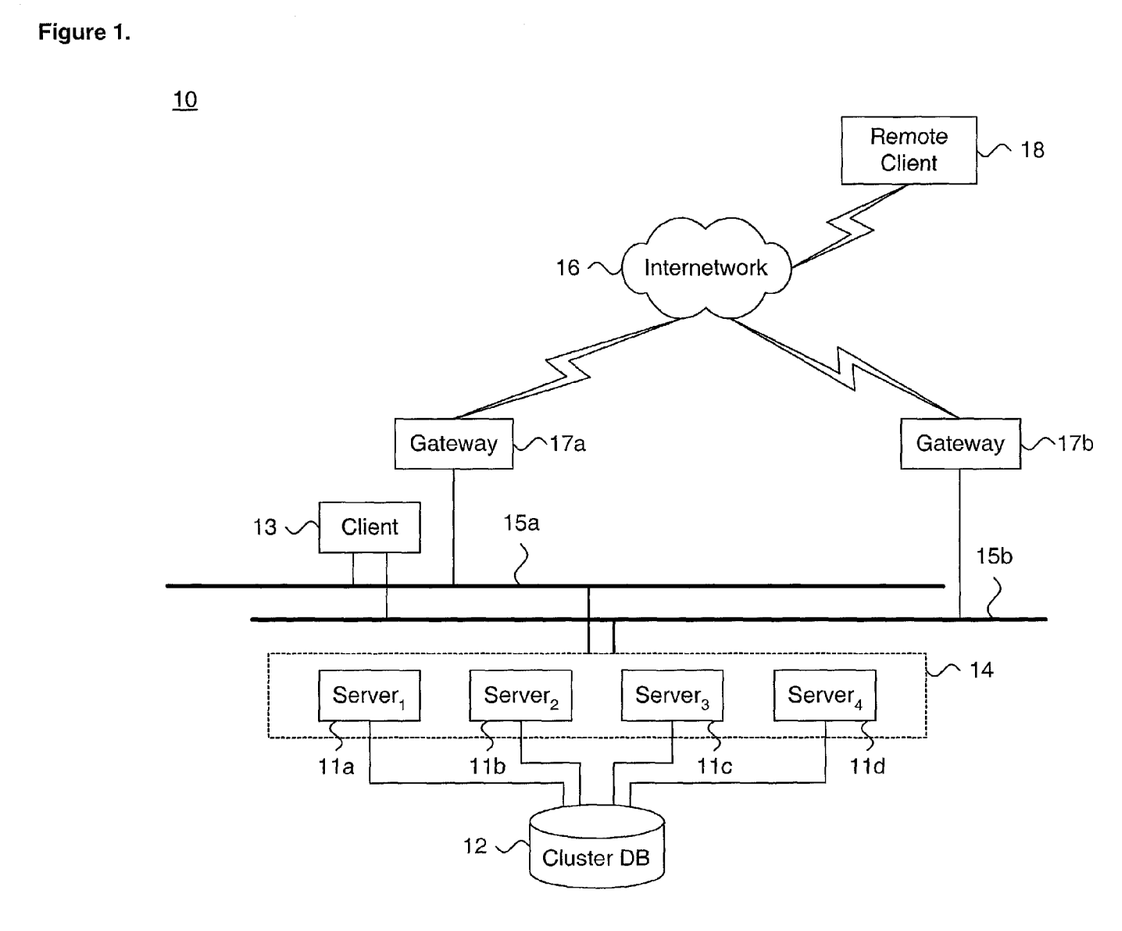
FIG. 1 is block diagram showing a cluster computing environment including cluster databases incorporating high availability components.

FIG. 1 is a block diagram showing a cluster database 12 incorporating high availability components. Parallel database servers 11a–d, each including a cooperative resource group are each coupled to a single cluster database 12 to form a high availability cluster framework 14, such as described in U.S. patent application Ser. No. 10/086,782, entitled "System And Method For Providing Cooperative Resource Groups For High Availability Applications," filed Feb. 28, 2002, pending, the disclosure of which is incorporated by reference. The servers 11 process a stream of transactions received from clients, such as client 13 and remote client 18, in parallel with each server processing an entire transaction.

Operationally, the remote client 18 is interconnected to the servers 11a–d via an internetwork 16, such as the Internet. Servers 11a–d and client 13 are interconnected via intranetworks 15a, 15b. Both intranetworks 15a and 15b are respectively interconnected to the internetwork 16 through gateways 17a–b. Other network topologies and configurations, including various combinations of intranetworks and internetworks are feasible, as would be recognized by one skilled in the art.

The cluster framework 14 appears as a single node to individual clients, which subscribe to the services published by each cluster. The client sessions receive notification of any changes in the services provided, such as described in U.S. patent application Ser. No. 10/086,949, entitled "System And Method For Providing Out-Of-Band Notification Of Service Changes," filed Feb. 28, 2002, pending, the disclosure of which is incorporated by reference, and transfer to alternate nodes as necessary.

Within each cluster framework 14, each of the database servers 11 incorporate high availability components, such as described in J. Gray et al., "Transaction Processing: Concepts and Techniques," pp. 128–38, M. Kaufmann Pubs., San Francisco, Calif. (1993), the disclosure of which is incorporated by reference. Failover processing is initiated upon the detection of the termination of a database instance, as further described below beginning with reference to FIG. 2. Likewise, upon a planned shutdown, an application will switch over to another instance of the database supporting the service. Other situations in which failover processing is required are possible, as would be recognized by one skilled in the art.

The response times provided by the substitute database servers 12 in the standby node may be longer than prior to failover or switchover until the ramp-up period for populating the database instance caches has run, although the ramp-up period can be substantially minimized by pre-connecting to the standby node and warming the database instance caches beforehand, such as described in U.S. patent application Ser. No. 10/086,842, entitled "System And Method For Pre-Compiling A Source Cursor Into A Target Library Cache," filed Feb. 28, 2002, pending, the disclosure of which is incorporated by reference.

The individual computer systems, including database servers 11, clients 13, and remote clients 18, are general purpose, programmed digital computing devices consisting of a central processing unit (CPU), random access memory (RAM), non-volatile secondary storage, such as a hard drive or CD-ROM drive, network interfaces, and peripheral devices, including user-interfacing means, such as a keyboard and display. Program code, including software programs, and data are loaded into the RAM for execution and processing by the CPU and results are generated for display, output, transmittal, or storage.

Figure 2:
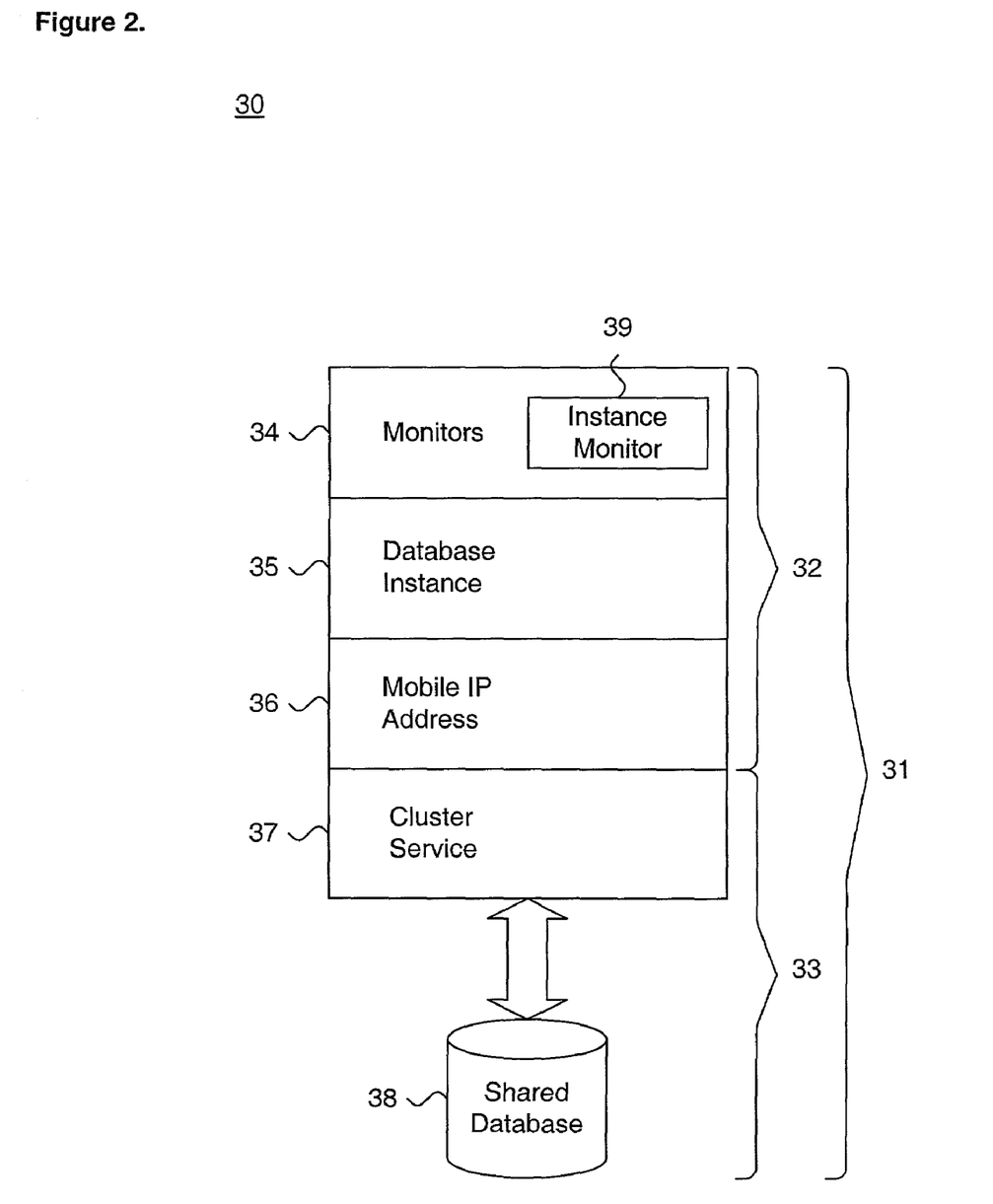
FIG. 2 is a functional block diagram showing a database stack implemented on a server node in accordance with the present invention.

FIG. 2 is a functional block diagram showing a database stack 31 implemented on a server node 30, including a system for detecting termination of an application instance using locks, in accordance with the present invention. The database stack 31 is logically divided into two parts: a cooperative resource group 32, and a resource 33. The cooperative resource group 32 includes a mobile internet protocol (IP) address 35 (or high availability application), a database instance 35, and external monitors 34. The mobile IP address 35 is assigned to the cooperative resource group 32 to support client access. More generally, a generic high availability application could execute within the cooperative resource group 32, instead of the database instance 35, as would be recognized by one skilled in the art.

The monitors 34 detect the failure of the database instance 35 or the loss of access to a resource 33, plus "hang" situations. The resource 33 includes a cluster service 37 and a shared database 38, as well as physical hardware devices, such as disk drives and network cards, and logical items, such as volume groups, TCP/IP addresses, applications, and database instances.

Within each cluster framework 14 (shown in FIG. 1), the cluster service 37 executes all operations on the cooperative resource group 32. An instance monitor 39 executes on a monitoring node to detect termination of a monitored database instance 35. The instance monitor 39 creates an exclusive lock on a resource 33, such as a pseudo-object, executing in the monitored database instance 35.

Each module within the database stack 31 is a computer program, procedure or module written as source code in a conventional programming language, such as the C++ programming language, and is presented for execution by the CPU as object or byte code, as is known in the art. The various implementations of the source code and object and byte codes can be held on a computer-readable storage medium or embodied on a transmission medium in a carrier wave. The instance monitor 39 operates in accordance with a sequence of process steps, as further described below beginning with reference to FIG. 4.

Figure 3:
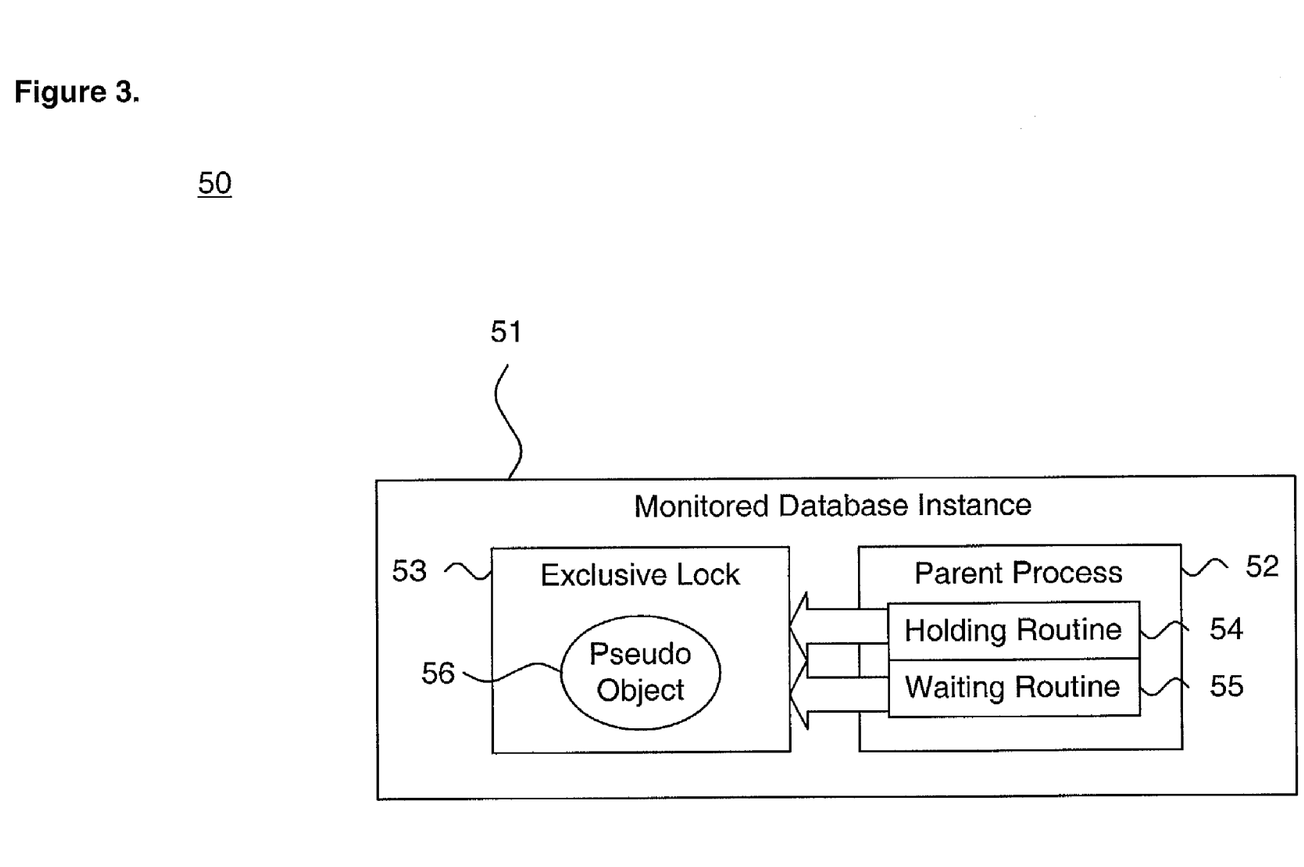
FIG. 3 is a block diagram showing a system for detecting termination of an application instance using locks in accordance with the present invention.

FIG. 3 is a block diagram showing a system for detecting termination of an application instance 50 using locks in accordance with the present invention. A database instance 51 is monitored by blocking on a resource 33 (shown in FIG. 2). A lightweight parent process 52 forks two child routines in serial order, holding routine 54 and waiting routine 55. The parent process 52 waits for one or both of the children routines to complete and acts on the outcome, as further described below with reference to FIG. 4.

The holding routine 54 connects to the monitored database instance 51 and establishes an exclusive lock 53 on a resource 33 using a pseudo-object 56 or other schema resource. The holding routine 54 sleeps without releasing the exclusive lock 53. The waiting routine 55 then connects to the monitored database instance 51 and attempts to acquire the exclusive lock 53. While the holding routine 54 holds the exclusive lock 53, the waiting routine blocks and waits without expiring. When the monitored database instance 51 terminates, the waiting routine 55 receives a standard error and returns an error code to the parent process 52.

When the monitored database instance 51 fails, the waiting routine 55 returns a standard error to indicate that the monitored database instance 51 has terminated, whereupon the parent process 52 signals the cluster service 37 that the monitored database instance 51 has terminated. However, if the waiting routine 55 returns nonstandard errors, all other return codes, error codes and signals are validated to determine whether the monitored database instance 51 has terminated. If so, the cluster service 37 is alerted. Otherwise, the parent process 52 cleans up the previous lock state and re-establishes the child routines.

In the described embodiment, the exclusive lock 53 is implemented as a user-defined lock against a psuedo-object rather than as a transaction lock against a schema object. The use of a user-defined lock avoids subsequent restarts of the child routines from interfering with the monitored database instance 51 and also avoids potential interference with transactional shutdown semantics.

The actions taken by the parent process 52 (shown in FIG. 3) in response to a return code from the waiting routine 55 are shown below in Table 1.

TABLE 1

| Return Code from Waiting Routine | Action by Parent Process |
|---|---|
| Standard Application Errors for Instance Termination | Exit immediately, signaling to the cluster service that monitored database instance has terminated. |
| Non-Standard Application Errors | Check if monitored database instance has terminated. If terminated, then: Exit immediately, signaling to the cluster service that monitored database instance has terminated. Else restart child routines. |

Figure 4:
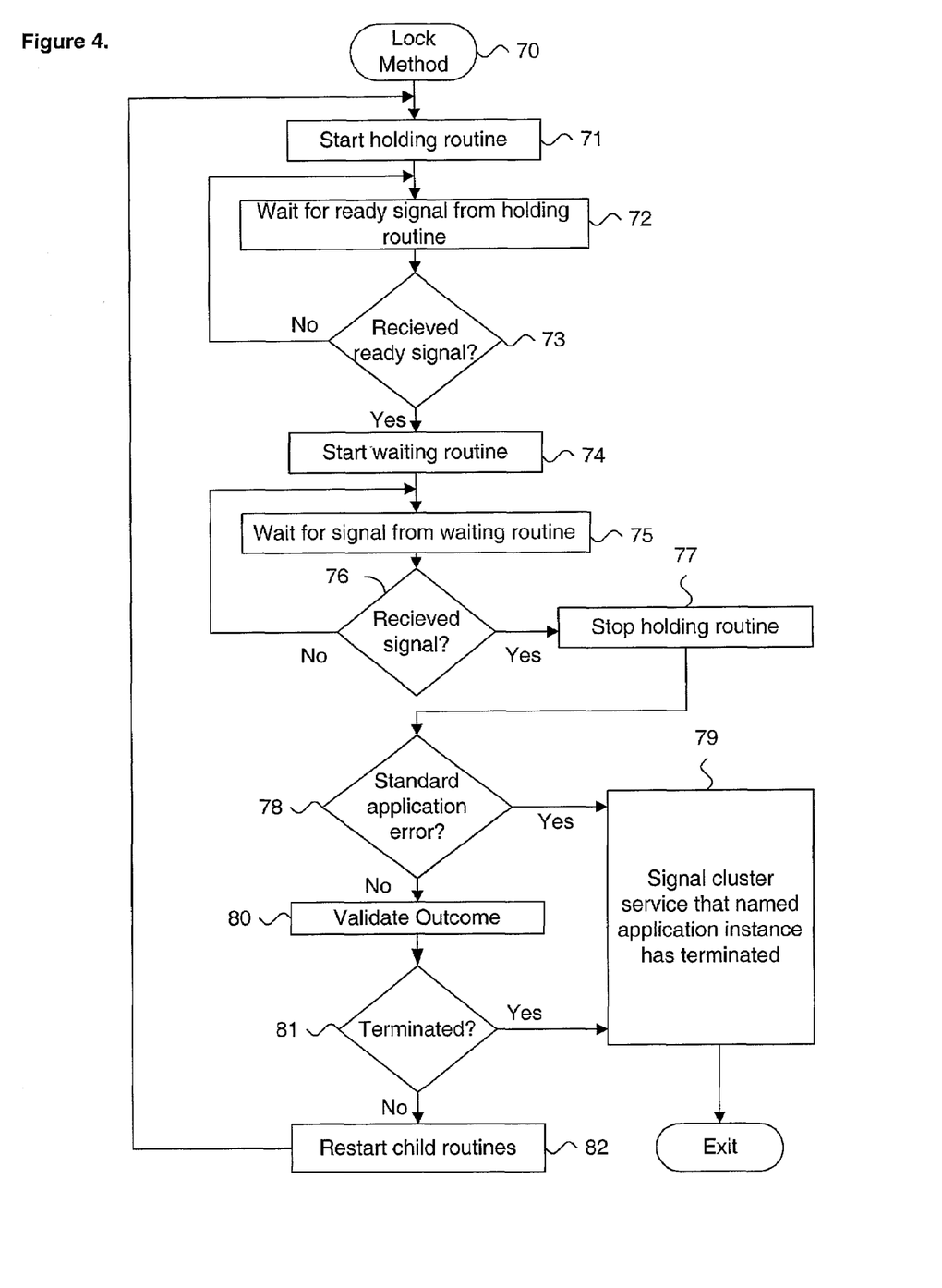
FIG. 4 is a flow diagram showing a method for detecting termination of an application instance using locks in accordance with the present invention.

FIG. 4 is a flow diagram showing a method for detecting termination of an application instance using locks 70 in accordance with the present invention. This method is responsible for forking the two child routines in serial order, waiting on their completion, and acting on any outcomes.

Thus, the holding routine 54 (shown in FIG. 3) is started (block 71) and the method waits for a ready signal from the holding routine 54 (block 72). If the ready signal is received (block 73), the waiting routine 55 is started (block 74). The method then waits for a signal from the waiting routine 55 (block 75).

At this point, normal execution of the monitored database instance 51 is presumed. When, and if, a signal is received from the waiting routine 55 (block 76), the holding routine 54 is stopped (block 77). If a standard application error has been received from the waiting routine 55 (block 78), the cluster service 54 is notified that the database instance 51 has terminated (block 79), and the routine ends. Otherwise, if a nonstandard application error has been returned from the waiting routine 55 (block 80), the nonstandard application error is validated (block 80). If the database instance 51 has terminated (block 81), the cluster service 54 is signaled (block 79), and the routine ends. Otherwise, the child routines are restarted (block 82) and processing continues as before (blocks 71–82).

Figure 5:
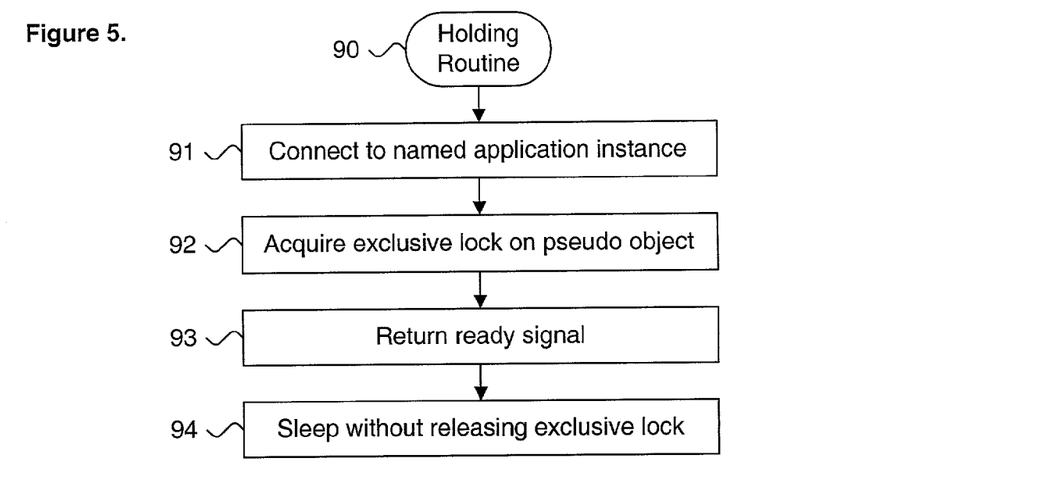
FIG. 5 is a flow diagram showing the holding routine used in the method of FIG. 4.

FIG. 5 is a flow diagram showing the holding routine 90 used in the method 70 of FIG. 4. The purpose of this routine is to connect to the monitored database instance 51 and establish a lock in exclusive mode.

Thus, the routine connects to the database instance 51 (block 91) and acquires an exclusive lock 53 on a pseudo-object 56 (block 92) or similar object. The routine returns a ready signal (block 93) to the parent process 52 and sleeps without releasing the exclusive lock 53 (block 94).

The holding routine 90 does not actually terminate. Rather, the holding routine 90 blocks on the psuedo-object 56 and sleeps until terminated by the parent process 52.

Figure 6:
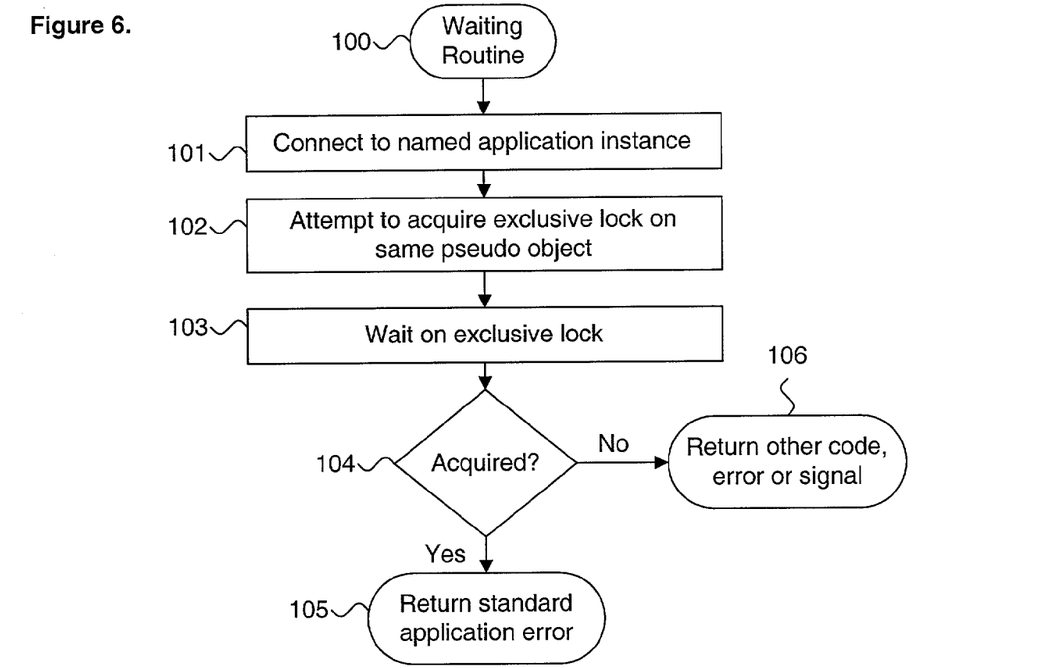
FIG. 6 is a flow diagram showing the waiting routine used in the method of FIG. 4.

FIG. 6 is a flow diagram showing the waiting routine 100 used in the method 70 of FIG. 4. The purpose of this routine is to connect to the database instance 51 and attempt to acquire the same exclusive lock 53. Thus, the routine connects to the monitored database instance 51 (block 101) and attempts to acquire the exclusive lock 60 on the same psuedo-object 59 (block 102) as the holding routine 90. Assuming that waiting processes do not expire, the routine waits on the exclusive lock 53 indefinitely (block 103). If the exclusive lock 60 is successfully acquired (block 104), a standard application error is returned (block 105) otherwise, another code error or signal is returned (block 106).

Table 2 summarizes the valid states for the parent process and child routines. The parenthetical numbers indicate the proper sequence of events.

TABLE 2

| Monitored Name Database instance | Holding Routine | Waiting Routine | Action by Parent |
| --- | --- | --- | --- |
| Up | Up | Up | Up |
| Up | Terminated (1) | Exit with success (2) | Restart both children (3) |
| Up | Up | Terminated, exit with error or a signal (1) | Restart both children (3) |
| Up | Terminated (1) | Terminated, exit with error or a signal (1) | Restart both children (3) |
| Down (1) | Up | Exit with error (2) | Exit, alerting cluster service (3) |

Figure 7:
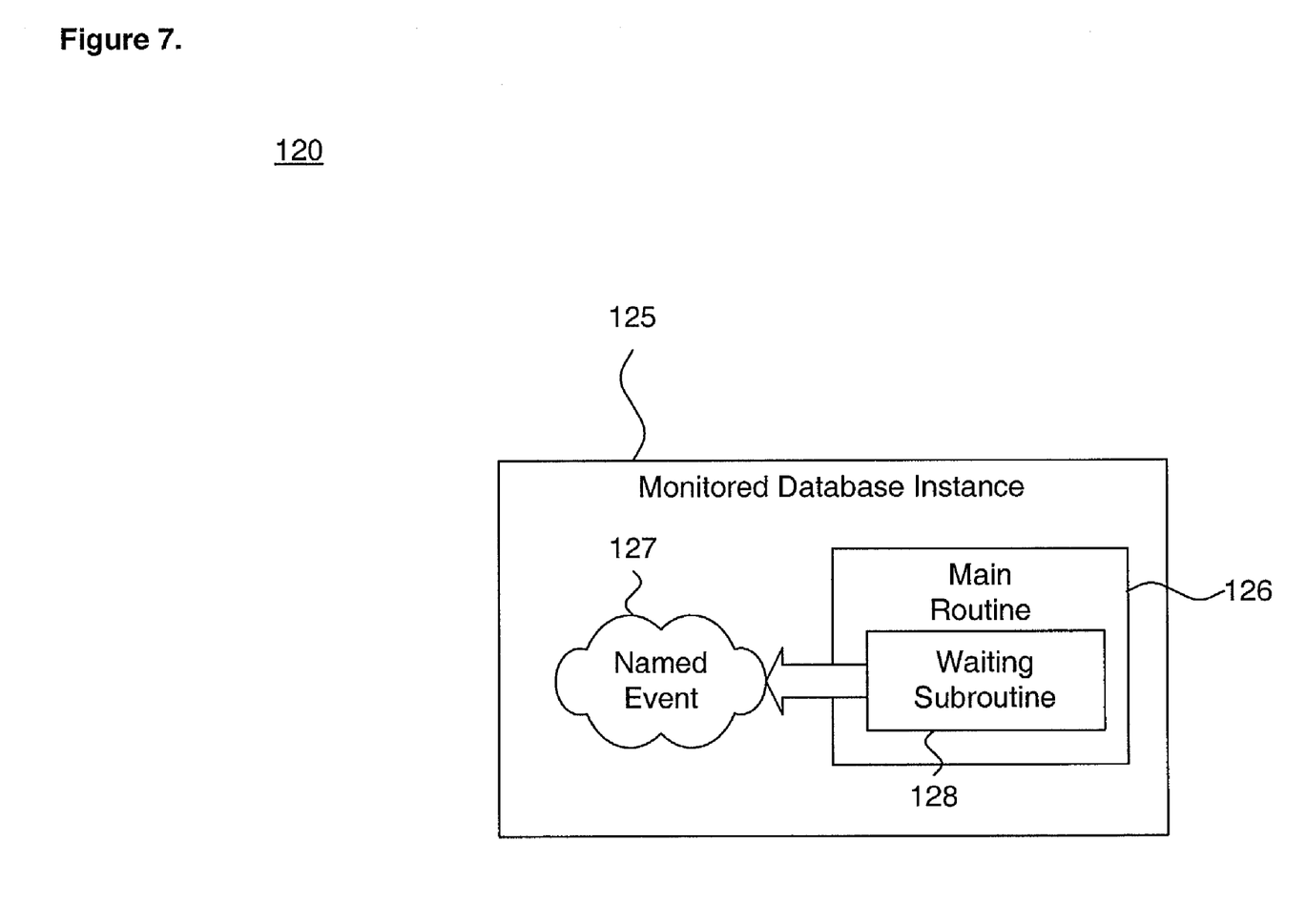
FIG. 7 is a block diagram showing a system for detecting termination of an application instance using events in accordance with the present invention.

FIG. 7 is a block diagram showing a system for detecting termination of an application instance 120 using events in accordance with a further embodiment of the present invention. A database instance 125 is monitored by blocking on an instance resource 33 (shown in FIG. 2). A main routine 126 blocks on a named event 127 in the monitored database instance 125 to detect termination using a waiting subroutine 128. The named event 127 blocks on a semaphore in the monitored database instance 125. Thus, when the monitored database instance 125 terminates, a standard error is returned immediately to the waiting subroutine 128 and provides notice of the termination of the monitored database instance 125.

Table 3, shown below, specifies the actions taken by the main routine 126 upon receiving an error code from the waiting routine 128.

TABLE 3

| Return Code From Waiting Subroutine | Action by Main Routine |
| --- | --- |
| Event received. | Process event and restart the waiting subroutine. |
| Standard application errors for instance termination | Exit immediately, signaling to cluster service that monitored database instance has terminated. |
| Any other return code, error, or signal. | Check if monitored database instance has terminated. If terminated, then Exit immediately, signaling to cluster service that monitored database instance has terminated. Else, restart the waiting subroutine. |

Figure 8:
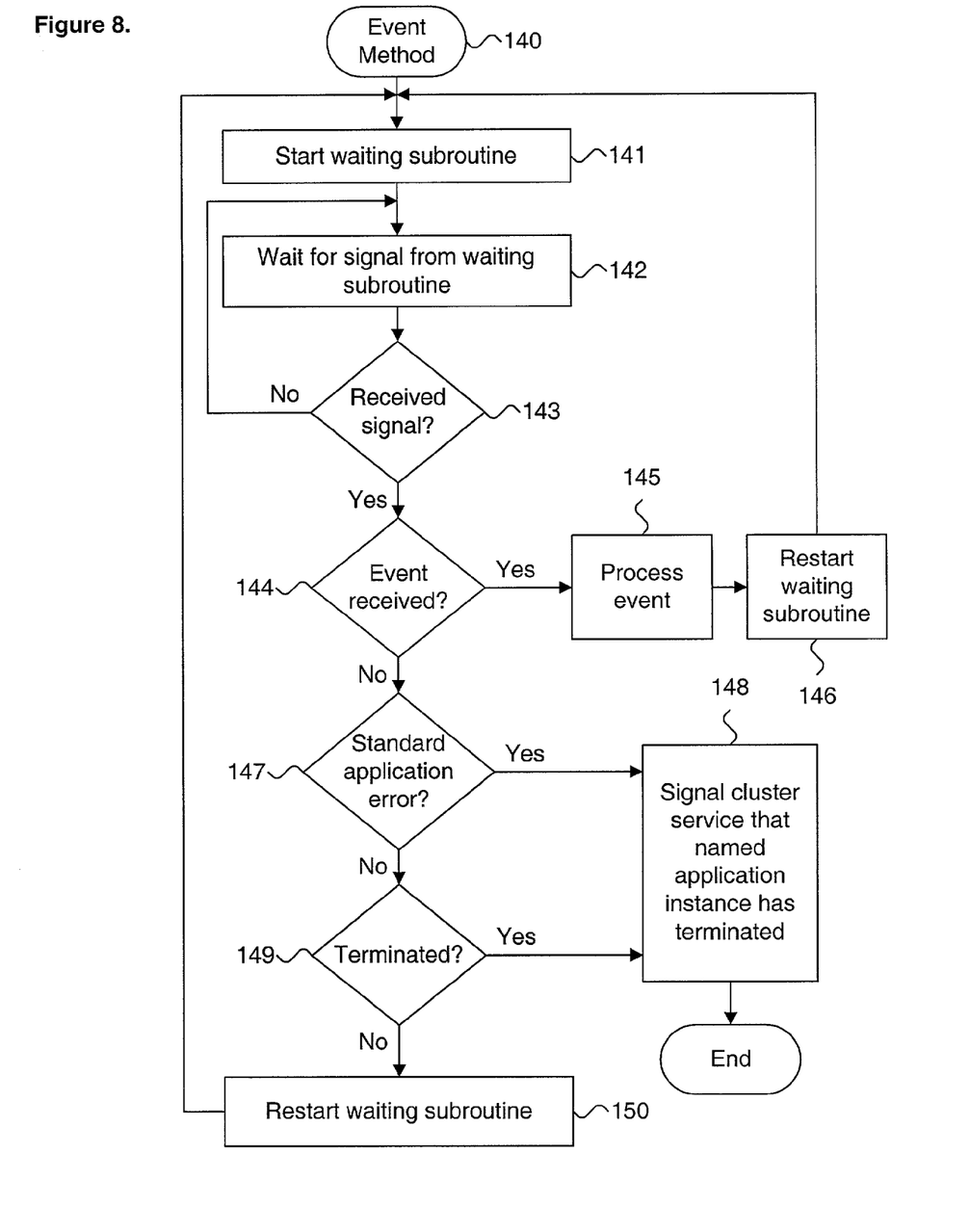
FIG. 8 is a flow diagram showing a method for detecting termination of an application instance using events in accordance with the present invention.

FIG. 8 is a flow diagram showing a method for detecting termination of an application instance 140 using events in accordance with a further embodiment of the present invention. The purpose of the event method 140 is to establish a wait condition for blocking on a named event 127 (shown in FIG. 7) and validating the outcome upon the occurrence of the named event 127.

Thus, the waiting subroutine 128 (shown in FIG. 7) is started (block 141) and the method waits for a signal (block 142). While waiting (block 143), the monitored database instance 125 executes in the normal fashion. When a signal is received from the waiting subroutine 128 (block 143), the method determines whether the received signal was pertinent to the occurrence of the named event 127 (block 144). If so, the named event 127 is processed (block 145) and the waiting subroutine 128 is restarted (block 146). In the described embodiment, the named event 127 constitutes a membership change event, although any other type of named event could also be used.

If the received signal is not the occurrence of the named event 127 (blcok144), yet constitutes a standard application error (block 147), the cluster service 124 is signaled that the monitored database instance 125 has terminated (block 148), after which the method ends. Otherwise, if the received signal does not constitute a standard application error (block 147), the method determines whether the monitored database instance 125 has terminated (block 149) and, if so, the cluster service 124 is signaled that the monitored database instance 125 has terminated (block 148), after which the method ends. Otherwise, if not terminated (block 149), the waiting subroutine 128 is restarted (block 150) and processing continues as before (block 141–150).

Figure 9:
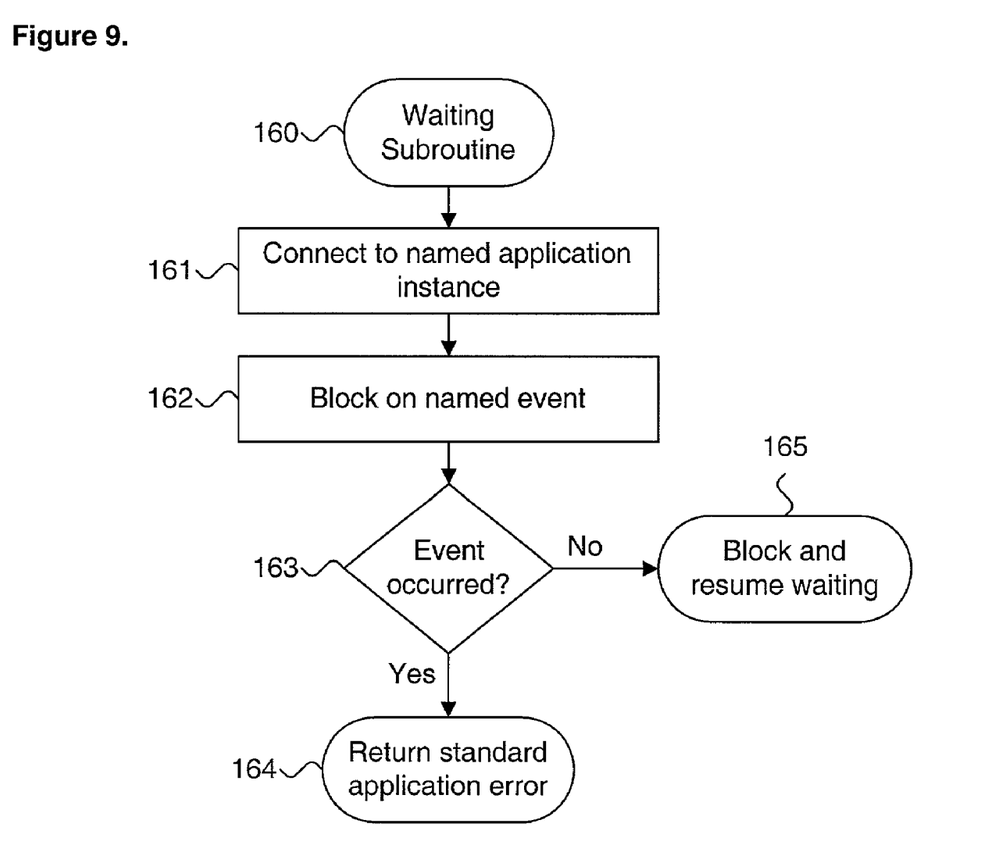
FIG. 9 is a flow diagram showing the waiting subroutine used in the method of FIG. 8.

FIG. 9 is a flow diagram showing the waiting subroutine 160 used in the method 140 of FIG. 8. The purpose of this routine is to cause the named event 127 to block on a semaphore in the monitored database instance 125.

Thus, the subroutine connects to the monitored database instance 125 (shown in FIG. 7) (block 161) and blocks on the named event 127 (block 162). Normal processing is transacted at the monitored database instance 125 until the occurrence of the named event 127. Upon the occurrence of the named event 127 (block 163), a standard application error is returned (block 164). Otherwise, the subroutine blocks and resumes waiting (block 165).

As shown in Table 4, the valid states for the main routine 126 and the waiting subroutine 128 are shown. The parenthetical numbers are used to indicate the sequence of events.

TABLE 4

| Monitored Database instance | Waiting Subroutine | Action by Main Routine |
|---|---|---|
| Up | Up | Up |
| Up | Exit with success (1) | Process event and restart Waiting Subroutine (2) |
| Up | Terminated, exit with error or signal (1) | Restart Waiting Subroutine (2) |
| Down (1) | Exit with error (2) | Process and exit, alerting cluster service (3) |

Referring back to FIG. 2, in a further embodiment, the cluster service 38 can receive direct notification of the termination of a database instance using instance monitors 42 executing within a database instance 35. This approach requires an event interface to allow the instance monitor 39 to alert a cluster manager that the application has terminated.

The database instance registers mandatory processes with a process group managed by the cluster service 38. A process group is established for each database instance 35 and when the application starts, all mandatory processes with the process group are registered. Thus, when one of the registered processes terminates, the process de-registers from the process group and induces a signal to the cluster service 38 that the application has terminated. This approach bypasses the use of external looks-alive monitors for those applications that incorporate instance monitors 42.

In the described embodiment, the Oracle Parallel Server and Oracle Real Application Clusters, licensed by Oracle Corporation, Redwood Shores, Calif., provide process monitors, system monitors, and lock monitors, plus other mandatory processes which are all registered with the node manager services. When any such process de-registers, the de-registration is detected by the node manager services and results in generation of an appropriate event.

While the invention has been particularly shown and described as referenced to the embodiments thereof, those skilled in the art will understand that the foregoing and other changes in form and detail may be made therein without departing from the spirit and scope of the invention.

What is claimed is:

1. A computer-implemented system for detecting termination of an application instance using locks, comprising:
 a holding process configured to obtain a first exclusive lock on an object associated with a database service instance;
 a waiting process configured to (a) request a second exclusive lock on the object after the holding process has been granted the first exclusive lock on the object, and (b) return a result signal, to a monitor process, upon at least one of acquiring the second exclusive lock and ceasing to be blocked; and
 the monitor process configured to process the result signal to determine whether the application instance has terminated.

2. A system according to claim 1, further comprising:
 the monitor process determining whether the application instance terminated based, at least in part, on whether the monitor process receives a standard error or a non-standard error from the waiting process.

3. A system according to claim 1, wherein the holding process resides at the same node as the application instance, and where the waiting process does not reside at the same node as the application instance.

4. A system according to claim 3, further comprising:
 a validation module configured to (a) check for termination of the monitored application and (b) signal termination of the monitored application to a cluster service.

5. A system according to claim 3, further comprising:
 a validation module configured to (a) check for termination of the monitored application and (b) restart the holding process and the waiting process.

6. A computer-implemented method for detecting termination of an application instance using locks, comprising:
 starting a holding process configured to perform the steps of
 (a) acquiring a first exclusive lock on an object associated with a database service instance, and
 (b) returning a ready signal, to a monitor process, upon successfully acquiring the first exclusive lock; and
 in response to receiving the ready signal, starting a waiting process configured to perform the steps of:
 (a) connecting to the application instance,
 (b) requesting a second exclusive lock on the object maintained by application instance, and
 (c) returning, to the monitor process, a result signal upon at least one of acquiring the second exclusive lock and ceasing to be blocked; and
 processing the result signal, at the monitor process, to determine whether the application instance has terminated.

7. A method according to claim 6, further comprising:
 determining whether the application instance terminated based, at least in part, on whether the monitor process receives a standard error or non-standard error from the waiting process.

8. A method according to claim 6, wherein the holding process resides at the same node as the application instance, and wherein the waiting process does not reside at the same node as the application instance.

9. A method according to claim 8, further comprising the steps of:
 checking for termination of the application instance; and
 signaling termination of the application instance to a cluster service.

10. A method according to claim 8, further comprising the steps of:
 checking for termination of the monitored application; and
 restarting the holding process and the waiting process.

11. A machine-readable medium carrying one or more sequences of instructions, which when executed by one or more processors, causes the one or more processors to perform the steps of method recited in claim 6.

12. A machine-readable medium carrying one or more sequences of instructions, which when executed by one or more processors, causes the one or more processors to perform the steps of method recited in claim 7.

13. A machine-readable medium carrying one or more sequences of instructions, which when executed by one or more processors, causes the one or more processors to perform the steps of method recited in claim 8.

14. A machine-readable medium carrying one or more sequences of instructions, which when executed by one or more processors, causes the one or more processors to perform the steps of method recited in claim 9.

15. A machine-readable medium carrying one or more sequences of instructions, which when executed by one or more processors, causes the one or more processors to perform the steps of method recited in claim 10.

* * * * *